April 18, 1967 W. PORTER 3,314,180

THREE DIMENSIONAL PICTURE ASSEMBLY

Filed Feb. 24, 1965 3 Sheets-Sheet 1

INVENTOR

Wyndham Porter

BY Polachek & Saulsbury

ATTORNEYS.

THREE DIMENSIONAL PICTURE ASSEMBLY

INVENTOR
Wyndham Porter

BY Polachek & Saulsbury
ATTORNEYS.

INVENTOR
Wyndham Porter
BY
Polachek & Saulsbury
ATTORNEYS.

United States Patent Office 3,314,180

Patented Apr. 18, 1967

3,314,180

THREE DIMENSIONAL PICTURE ASSEMBLY

Wyndham Porter, 60 W. 142nd St., New York, N.Y. 10037

Filed Feb. 24, 1965, Ser. No. 434,780
6 Claims. (Cl. 40—160)

Figures 1, 2:
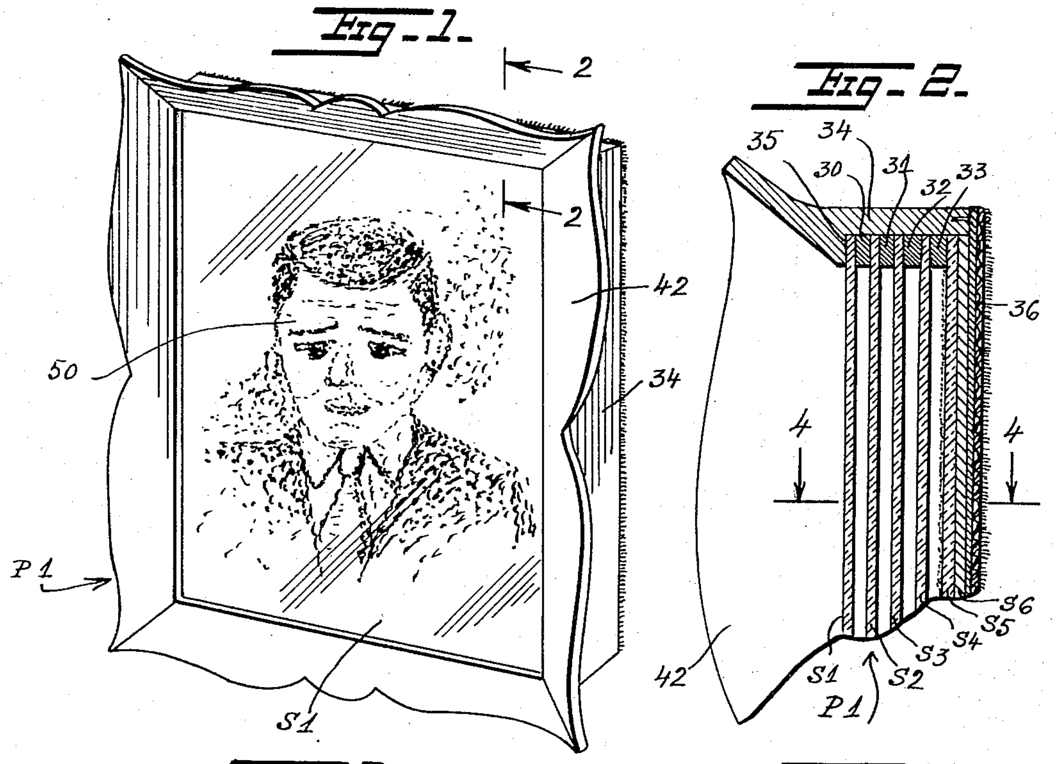

This invention concerns improvements in three dimensional pictures.

It has been known heretofore that a composite still picture of a scene can be made by superimposing a plurality of transparent sheets each having a part of the scene drawn thereon to produce a three dimensional scenic effect. Thus a picture of a landscape might have trees drawn on one sheet, clouds drawn on another sheet, a house drawn on a third sheet, and the three transparent sheets would then be superimposed. While the result would produce a three dimensional optical illusion as a whole, the individual objects drawn on the several sheets would appear as two dimensional figures, flat in themselves. The composite would lack a progressive showing of depth from front to back. In other words, there would be pictorial discontinuity in depth between the successive transparent sheets.

The present invention is directed at overcoming this deficiency by using a novel method of preparing the components of a laminated three dimensional picture, portrait or painting. The invention is further directed at producing a three dimensional picture in which there is pictorial continuity in depth so that the pictured objects seem solid from front to back. This contrasts with prior three dimensional pictures which seem to be no more than assemblages of colored, flat silhouettes set one behind the other.

According to the present invention the novel effect is accomplished by separating the tone, color, outline, highlights, background, etc. on different transparent sheets or plates spaced one behind the other, so that any pictured object is spread in depth through a plurality of transparent sheets. The illusion may be heightened by treating of the sheets with material best suited to the particular effect desired. For example, where the appearance of hair is required, strands of hair will be applied to one or more transparent sheets. Where clothing is to be pictured, bits of cloth will be applied. The general effect will be that of a three dimensional picture truly continuous in depth from front to back.

It has been further discovered that it is possible to impart a strikingly life-like quality to the three dimensional picture produced by the present method, by slightly vibrating the several sheets, alternately bringing them closer together and then separating them. The range of oscillation may range up to one eighth of an inch where the pictures are viewed at close range and up to about twenty feet, and may range up to a half inch at viewing distances from twenty to two hundred fifty feet. The frequency of oscillation may be continuous at a frequency ranging from ten to one hundred thousand or more cycles per second, but a frequency of about fifteen cycles per second is preferred since this is below the audible frequency range and is still rapid enough to produce the desired optical effect.

It is therefore a principal object of the invention to provide a three dimensional picture having continuity of depth in each pictured subject from front to back.

A further object is to provide a three dimensional picture assembly in which color tones, shading, outline, and other pictorial characteristics of each pictured subject are applied on different transparent spaced sheets.

Another object is to provide a three dimensional picture assembly as described with means for vibrating the several sheets with respect to each other for continuously varying the spacing therebetween.

A further object is to provide a novel three dimensional picture assembly including spaced transparent sheets separated by resilient, elastic frames, with electromagnetic vibrators oscillating the sheets to vary the spacing therebetween continuously.

For further comprehension of the invention and of the objects and advantages thereof, reference will be had to the following description and accompanying drawings, and to the appended claims in which the various novel features of the invention are more particularly set forth.

Figure 3:
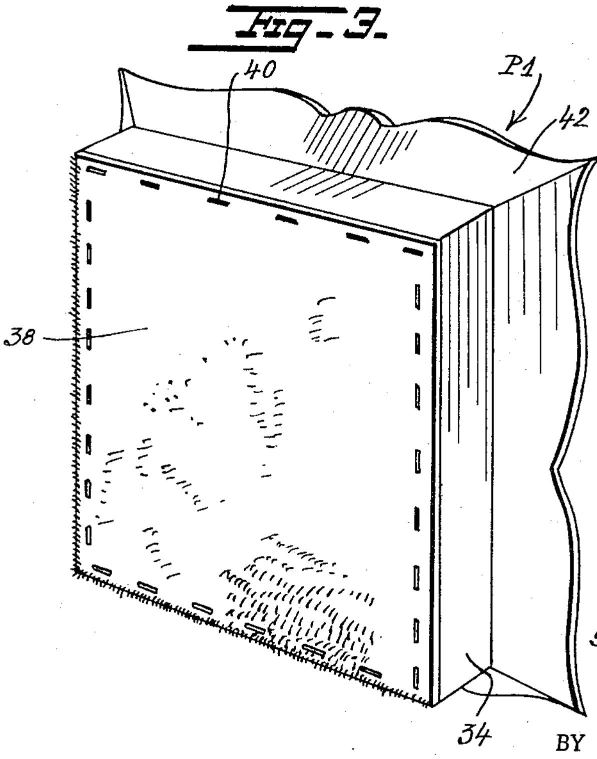
Figure 4:
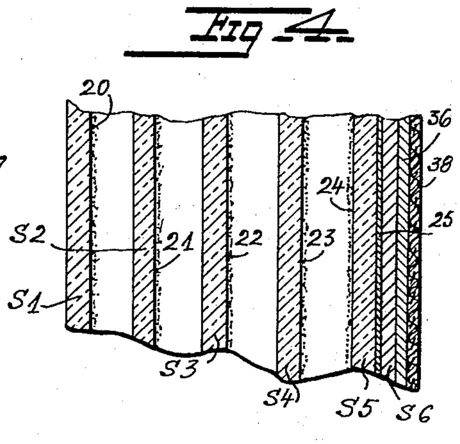
Figure 4A:
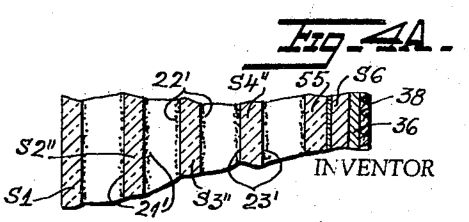
Figure 5:
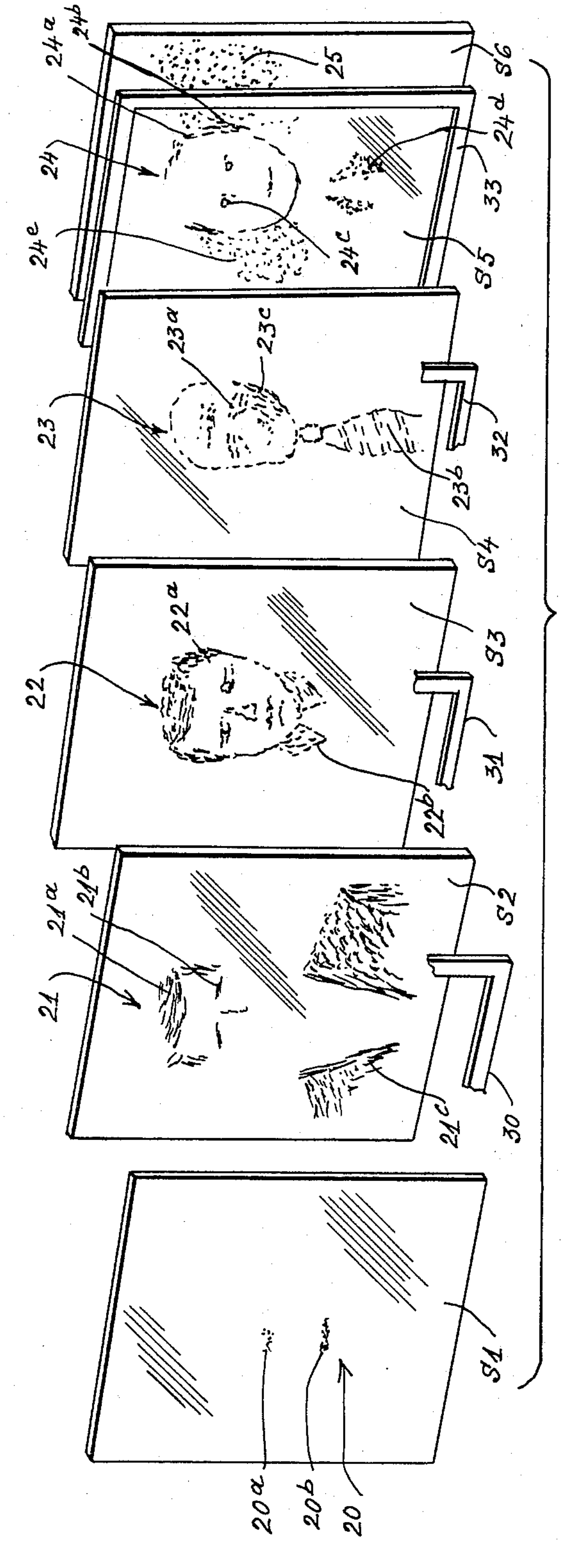
Figure 6:
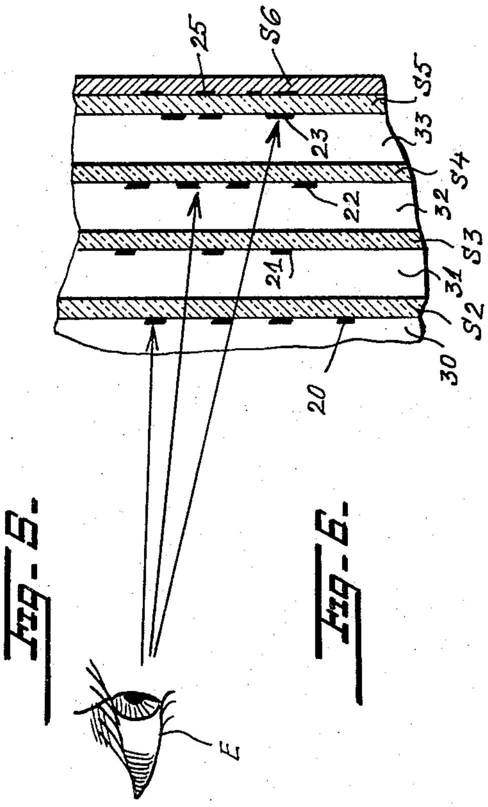
Figure 7:
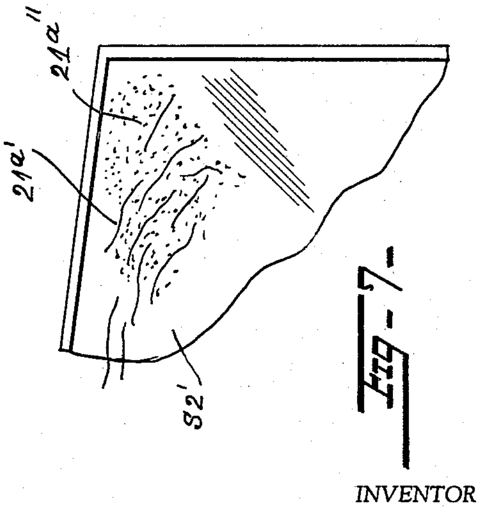
Figures 8, 9, 10, 11, 12:
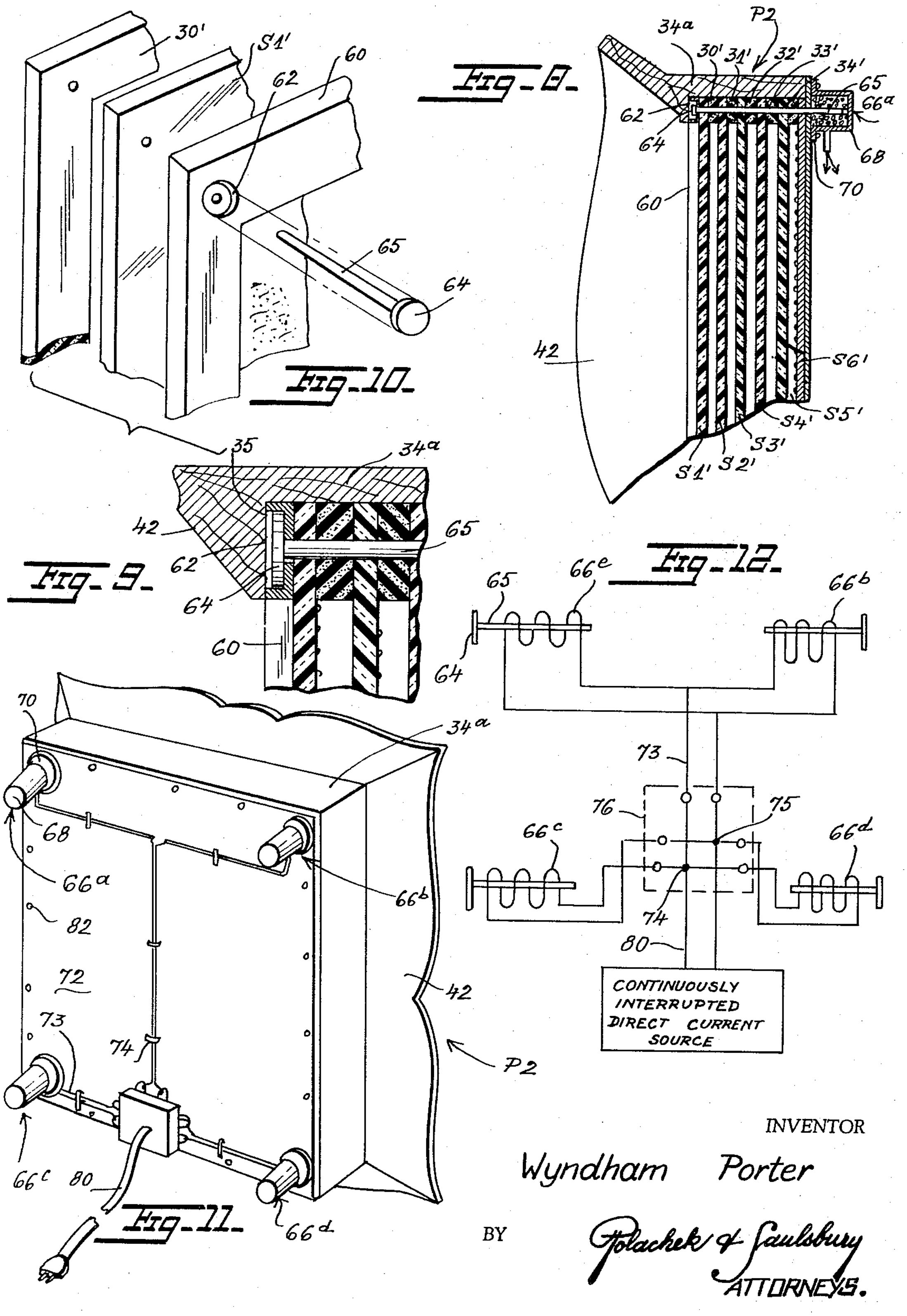

In the accompanying drawings forming a material part of this disclosure:

FIGURE 1 is a perspective front and side view of a framed three dimensional picture assembly embodying the invention, FIG. 2 is an enlarged fragmentary sectional view taken on line 2—2 of FIG. 1, FIG. 3 is a perspective rear and side view of the framed picture assembly of FIG. 1, FIG. 4 is a further enlarged fragmentary sectional view taken on line 4—4 of FIG. 2, FIG. 4A is a view similar to a part of FIG. 4 illustrating a modification of the invention, FIG. 5 is an exploded perspective view of parts of the picture assembly of FIG. 1, FIG. 6 is a view similar to part of FIG. 4, used in explaining the optical effect produced by the invention, FIG. 7 is an oblique view of part of a transparent sheet treated by the method of the present invention, FIG. 8 is an enlarged sectional view similar to FIG. 4, of part of another picture assembly embodying the invention, FIG. 9 is a further enlarged view of a portion of FIG. 8, FIG. 10 is an exploded perspective view of parts of the picture assembly of FIG. 8, FIG. 11 is a rear and side perspective view of the picture assembly of FIG. 8, and FIG. 12 is a diagram of an electrical circuit used with the picture assembly of FIG. 8.

Referring first to FIGS. 1–5, there is shown a picture assembly P1 including a plurality of rectangular transparent sheets S1–S5 made of plastic film. The rear sheet S5 is backed up by an opaque sheet S6. On the rear side of sheets S1–S4 and on the front sides of sheets S5, S6 are applied dots and spots of paint 20–25.

The several sheets are spaced apart predetermined distances ranging from one sixteenth to three-eighths of an inch for a picture to be viewed at close range up to twenty feet. Spacing is accomplished by rectangular frame-like cardboard, metal or plastic spacers 30–33. Spacing can be decreased by using thinner spacers. Spacing can be increased by using two or more superimposed thin spacers. Spacing can be varied between sheets by using different numbers of thin spacers, each about one sixteenth of an inch in thickness.

The entire group of sheets S1–S6 with their interposed spacers may be installed in recess 35 of a rectangular frame 34. A backing board 36 which can be covered by a layer of felt or flocking 38, is secured by staples 40 to the rear end of frame 34. The frame may have a flaring shield 42 all around to cut off light approaching from a shallow angle with respect to the front plane of the assembly. This cuts down glare and enhances the life-like appearance of the picture.

The picture assembly P1 is shown in FIG. 1 presenting a composite three dimensional portrait 50. FIG. 5 shows best how this portrait is constructed. On the rear side of first front sheet S1 is applied a plurality of dots or spots 20 which may be painted, etched or otherwise applied. Preferably translucent or transparent inks or paints will be used. The dots or spots 20 represent no more than highlights or reflections of light from the most forwardly extending vertical plane of the subject such as the nose 20*a* and chin 20*b*.

On the front side of sheet S2, dots 21 may include hair 21*a*, eyebrows 21*b*, and coat 21*c* representing a projection from a second vertical plane. Instead of using ink or paint, strands of hair can be used for hair 21*a*, and eyebrows 21*b* and pieces of cloth can be used to represent coat 21*c*. The hair and cloth will be attached by a suitable adhesive. Alternatively combinations of hair 21*a'* and painted dots 21*a''* can be used as illustrated on sheet S2' in FIG. 7.

On the front of sheet S3 is drawn or painted by dots 22 only the facial outline 22*a* and collar 22*b* of the person whose portrait is depicted. A pointilism system of painting is preferably used with differently colored transparent or translucent dots of ink or paint slightly separated by transparent areas. The ink or paint is preferably transparent or translucent.

On the front of sheet S4 are painted dots 23 representing whites of eyes 23*a*, necktie 23*b* and side of face 23*c* from another vertical plane of the subject.

On sheet S5 appears ink or paint spots or dots 24 representing the near left side of the head 24*a*, ear 24*b*, eye pupils 24*c*, shirt 24*d*, and part of the background 24*e*. On the front side of opaque sheet S6 is a dotted background, 25. If desired the spots and dots can be applied to both sides of the transparent sheets as indicated by dots 21', 22' and 23' on the rear sides of sheets S2''–S4'' in FIG. 4A. The composite portrait viewed as shown in FIG. 6 presents the several dots on the spaced sheets or plates. This view will be different as seen viewed by both eyes E of the viewer and the composite view will appear not only three dimensional but also continuous in depth from front to back of the portrait.

I have discovered that one of the most important physical reasons why this picture seems to be continuous in depth is that the person viewing the picture does not keep his head and eyes absolutely still. There are continuous involuntary slight lateral movements and back and forward movements of the head so that there comes to the eyes a minutely changing picture. The optical effect to most observers is so striking that they will at first tend to disbelieve they are seeing a three dimensional picture continuous in depth. To confirm to himself that he is really seeing a picture continuous in depth an observer will often move his head consciously from side to side or up and down. Since the successive planes of the subject have been portrayed on the successive sheets or plates, this head movement of the observer will cause relative movement of the parts of the subject just as the viewer would expect if he actually viewed a living person. This will confirm the optical impression of a three dimensional picture continuous in depth.

I have further discovered that it is possible to enhance the appearance of continuous depth and the illusion of a three dimensional presentation, by imparting to the several sheets or plates vibratory movements simulating somewhat the involuntary movements of viewers. The result is to spread in depth the showing of each transparent sheet. FIGS. 8–12 illustrate how this movement can be accomplished in a simple and effective manner.

It is noted through experimentation, the vibratory movements of sheets or plates bearing the pupils of the eyes and the lips, up and down instead of spreading in depth the showing of each transparent sheet will enhance the appearance of continuous depth and the illusion of a life-like presentation. Of course all of the sheets will spread in depth as illustrated in FIGS. 8–12.

Between the transparent sheets S1'–S6', spacers 30'–34' are made of elastic, resilient material such as spongy rubber, urethane plastic foam or the like. A rigid metal or plastic frame 60 is placed in front of sheet S1'. In this frame are four recesses 62 located at corners of the frame and open at the front of the frame. In these recesses fit disklike heads 64 of four plunger shafts 65. Four solenoids 66*a*–66*d* are arranged to retract the four shafts axially when the coils of the solenoids are energized by direct current continuously interrupted at predetermined frequency. The solenoids are enclosed in casings 68 having flanges 70 secured to rigid rear panel or board 72 of the picture assembly P2. Wires 73 are connected in parallel from the coils of the solenoids 66*a*–66*d* to terminals 74, 75 in a terminal box 76 as shown in FIGS. 11 and 12. The terminals 75, 75 are connected via a cable 80 to an external source of cyclically interrupted direct current.

Frame 34*a* has a structure similar to frame 34 of picture assembly P1 and holds the laminated array of sheets and spacers erect for front viewing. The back board 72 may be attached by screws 82 to the rear end of frame 34*a* as shown in FIGS. 8 and 11. FIGS. 8–10 show one of shafts 65 extending through holes 81, 82 and 83 in the frame 60, sheet S1' and spacer 30'. When the cyclically interrupted direct current is applied to the solenoids they retract the plungers simultaneously during one half of each cycle. During this part of the cycle the elastic spacers 30'–34' are compressed and the sheets S1'–S6' are brought closer to each other. During the other half of each cycle the spacers expand and retract the plungers. During continuous operation the sheets S1'–S5' oscillate, vibrate continuously to enhance the illusion of continuous depth of the three dimensional picture. The effect is produced at all frequencies, even at supersonic rates. It is preferred that the speed of vibration should be outside of the audible range or else objectionable hum will be produced since the vibrating sheets or plates will then act as radiating audio diaphragms. A vibration rate of about fifteen cycles per second is preferred since at this rate movement of the sheets is not perceptible to the eye due to natural visual retention, and this rate is just below the bass end of the audio frequency spectrum. It is possible to vibrate the sheets at supersonic speeds above 15,000 cycles per second to produce the same desired optical effect of continuous depth without producing objectionable audible sounds as the sheets vibrate.

The amplitude of vibration will depend on the initial spacing of the sheets. In general an amplitude of vibration of not less than ten percent and not more than thirty percent of the spacing will be satisfactory. Too small an amplitude of vibration will produce no apparent visual effect. Too large an amplitude will cause the elastic spacers to become fatigued and lose their elasticity. If the sheets are spaced one quarter of an inch apart and vibrate one sixteenth of an inch in amplitude or about twenty-five percent of the spacing, their total excursion will be one-eighth of an inch or about fifty percent of the spacing. To the eye viewing the picture there will appear to be no difference in spacing between the successive sheets and the picture will appear to present a solid three dimensional subject supported in continuous space.

This sharply contrasts with prior three dimensional pictures made on transparent sheets since there the portrayed subjects appear to be sliced into sections supported on individual transparent sheets, like two dimensional shadows one behind the other.

Although six transparent sheets or plates have been shown in the drawings more or less than six sheets may be used. If desired thick transparent glass or plastic plates having a thickness comparable with the spacing between them may be used instead of thin transparent plastic sheets. Other ways may be devised for vibrating the several plates or sheets with respect to each other.

While I have illustrated and described the preferred embodiments of my invention, it is to be understood that I do not limit myself to the precise constructions herein made and that various changes and modifications may be made within the scope of the invention as defined in the appended claims.

What is claimed is:

1. A picture of a subject having high lights, color tones outline and background, said picture comprising colored material in predetermined arrays applied to a plurality of transparent sheets, the array of said material on one sheet depicting high lights appearing in one vertical plate of the subject, the array on a second sheet depicting the color tones in a second vertical plane of the subject, the array on a third sheet depicting the outline in a third plane of the subject, the array on a fourth sheet depicting the background in a fourth plane of the subject, and elastic frame-like spacers at margins of the sheets holding the same in spaced positions parallel to and behind each other, a rigid frame enclosing the peripheries of the sheets and spacers and rigid means for vibrating the sheets while the spacers are alternately compressed and expanded to enhance the appearance of continuous depth.

2. A picture assembly presenting a three dimensional pictorial effect wherein a subject appears to have continuous depth, comprising a plurality of transparent sheets, arrays of colored spots applied to at least one side of each of said sheets, the array of spots on each sheet representing a projection from a different vertical plane of said subject, elastic frame-like spacers spacing the sheets in parallel spaced relationship behind each other, a frame peripherally engaging the spacers and sheets for viewing in an upright position, and means for vibrating the sheets while the spacers are alternately compressed and expanded to enhance the appearance of continuous depth.

3. A picture assembly presenting a three dimensional pictorial effect wherein a subject appears to have continuous depth, comprising a plurality of transparent sheets, arrays of colored spots applied to at least one side of each of said sheets, the array of spots on each sheet representing a projection from a different vertical plane of said subject, elastic frame-like spacers, spacing the sheets in parallel spaced relationship behind each other, a frame peripherally engaging the spacers and sheets for viewing in an upright position, a backboard at the rear one of said sheets, electromagnets at corners of said board, a rectangular driving frame at the first one of said sheets, said electromagnets having plungers engaged with said frame and extending through corners of the spacers and sheets, and means for energizing said electromagnets to vibrate the sheets while the spacers are alternately compressed and expanded, for continuously varying the spacers between the sheets and enhancing the appearance of continuous depth of the subject.

4. A picture of a subject having high lights, color tones outline and background, comprising colored material in predetermined arrays applied to a plurality of transparent sheets, the array of said material on one sheet depicting highlights appearing in one vertical plate of the subject, the array on a second sheet depicting the color tones, in a second vertical plane of the subject, the array on a third sheet depicting the outline in a third plane of the subject, the array on a fourth sheet depicting the background in a fourth plane of the subject, and spacers at margins of the sheets holding the same in spaced positions parallel to and behind each other, each of said spacers being an elastic frame-like member, a frame peripherally engaging the spacers and sheets for viewing in an upright position, and means for vibrating the sheets while the spacers are alternately compressed and expanded to enhance the appearance of continuous depth.

5. A picture of a subject having high lights, color tones outline and background, comprising colored material in predetermined arrays applied to a plurality of transparent sheets, the array of said material on one sheet depicting high lights appearing in one vertical plate of the subject, the array on a second sheet depicting the color tones, in a second vertical plane of the subject, the array of a third sheet depicting the outline in a third plane of the subject, the array on a fourth sheet depicting the background in a fourth plane of the subject, and spacers at margins of the sheets holding the same in spaced positions parallel to and behind each other, each of said spacers being an elastic frame-like member, a frame peripherally engaging the spacers and sheets for viewing in an upright position, a backboard at the rear one of said sheets, electromagnets at corners of said board, a rectangular driving frame at the first one of said sheets, said electromagnets having plungers engaged with said frame and extending through corners of the spacers and sheets, and means for energizing said electromagnets to vibrate the sheets while the spacers are alternately compressed and expanded, for continuously varying the spacing between the sheets and enhancing the appearance of continuous depth of the subject.

6. A picture assembly presenting a three dimensional pictorial effect wherein a subject seems to have continuous depth, comprising a plurality of transparent sheets, arrays of spots applied to at least one side of each of said sheets, the spots on each sheet representing a projection from a different vertical plane of said subject, and spacer means holding the sheets in parallel spaced relationship one behind the other, so that the sheets present in composite an illusion of a three dimensional subject continuous in depth, certain of said spots being made of a material which is same as the material represented by the array of spots, and means for continuously vibrating the sheets to vary the spacing therebetween continuously.

References Cited by the Examiner

UNITED STATES PATENTS

| | | | |
|---|---|---|---|
| 2,556,798 | 6/1951 | Concordet | 40—160 X |
| 2,577,320 | 12/1951 | Fenyo | 40—160 X |
| 2,594,903 | 4/1952 | Freedman et al. | 40—135 |
| 3,190,019 | 6/1965 | Davis | 40—77 |
| 3,248,816 | 5/1966 | Stein et al. | 40—139 |

EUGENE R. CAPOZIO, *Primary Examiner.*

W. J. CONTRERAS, *Assistant Examiner.*